Nov. 19, 1929.    R. CONRAD    1,735,917
BOX TONGS
Filed April 14, 1928

Inventor
R. Conrad
By *Clarence A. O'Brien*
Attorney

Patented Nov. 19, 1929

1,735,917

UNITED STATES PATENT OFFICE

RAY CONRAD, OF WAPATO, WASHINGTON

BOX TONGS

Application filed April 14, 1928. Serial No. 270,057.

This invention relates to an improved box tong especially constructed for handling fruit shipping boxes.

I am aware of a box tong now on the market, and used extensively which comprises pivotally connected levers having doublehooks on their ends for engagement with the ends of the box. This double arrangement of gripping hooks is however objectionable in that the prongs on the ends of the hooks become easily disengaged from the wood and allow the box to drop and the fruit to spill out.

This is because of the natural careening action of the box due to the unreliable grip of the double prongs.

With the foregoing objection in mind, I have evolved and produced a new type of tong comprising pivotally connected levers having single hooks and tongs in order to more firmly grasp or grip the box, and to permit the grip to be had at almost any place on the box, whereby to effect handling of the box.

In the drawings:—

Figure 3:
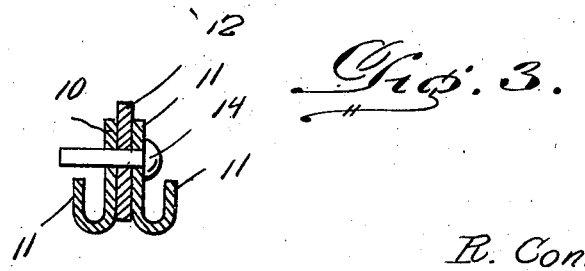
Fig. 3 is an enlarged section taken approximately upon the plane of the line 3—3 of Fig. 1.

In carrying out the invention, I provide a tong or tool which comprises two main parts 4 and 5 respectively. The part 4 at the left is composed of three elements; namely, a flat metal bar, 6 having a hook 7 provided with a single prong 8, this bar being fastened by rivets 9 between a pair of metal strips 10. These metal strips are disposed in spaced parallelism, and as shown in Fig. 3, have their lower edges bent upon themselves and bent upwardly as at 11 to provide hand grips. The part 5 is in the form of a relatively long bar 12, and has one end provided with a multiplicity of apertures 13, these being arranged between the strips 10 and having adjustable pivotal connection therewith through the medium of a pivot pin 14. The opposite end of the bar 12 is formed with a hook 15 and a single gripping prong 16.

Figure 1:
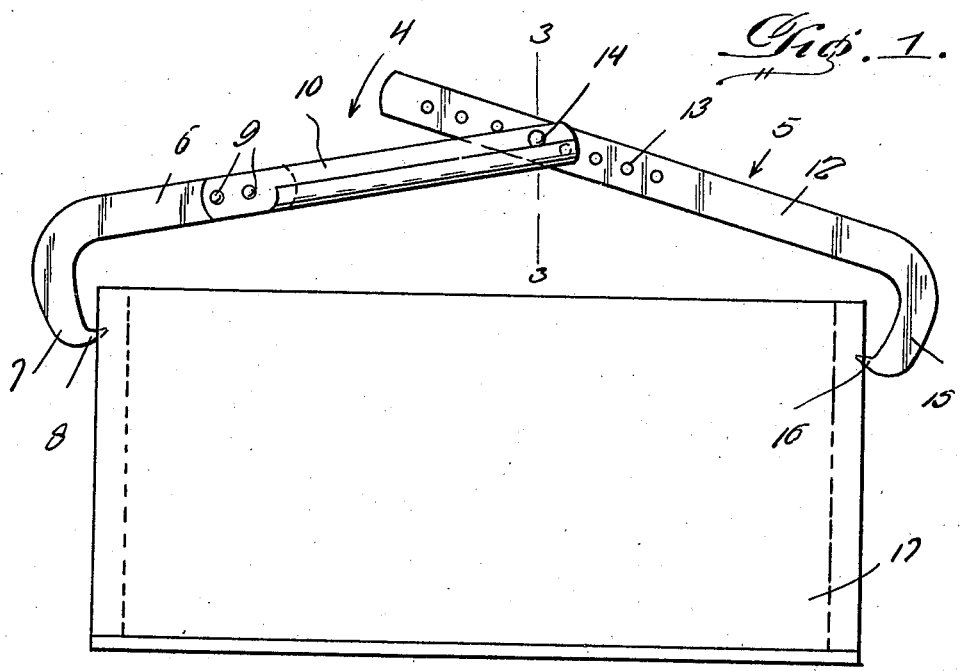
Figure 1 is a side elevation showing the improved tong associated with a fruit containing and shipping box.
Figure 2:
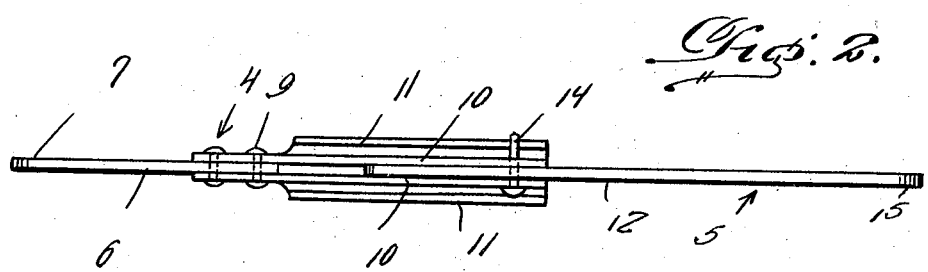
Fig. 2 is a top plan view of the same.

In using the device, it is placed as shown in Fig. 1, with the prongs 8 and 16 embedded in the end walls of the box 17. Then by placing the hand around the hand grip 11, the box can be readily transported in the field.

From the foregoing, it is obvious that my principal aim is to generally improve upon devices of this class, by providing one of comparative simplicity, and durability, which is characterized by two parts adjustably connected together and the parts having prong equipped hooks to become firmly embedded in the ends of the box. These parts might be broadly referred to as levers, the long one being provided with the adjusting apertures for the pivot one, and the short one carrying the especially designed and easy hand grip.

As before indicated, this single hook arrangement permits the hook to be engaged with the box in a more or less hap-hazard manner, and obviates the necessity of correct centering of the hooks, such as is necessary with the double prong hooks now employed.

It is thought that by considering the description in connection with the drawings, a clear understanding of the invention will be had. Therefore, a more lengthy description is regarded unnecessary.

Having thus described my invention, what I claim as new is:—

A box prong of the class described comprising two parts, one part embodying a relatively short flat bar having a hook at its outer end and an inturned pointed prong on the extremity of the hook, together with a pair of spaced parallel strips riveted to the inner end of said bar and having their bottom longitudinal edges bent and turned up to form spaced hand grips, the remaining part comprising a relatively long bar formed at its inner end with a multiplicity of apertures and formed at its outer end with a hook terminating in a prong, the apertured end of said second-named bar being arranged between the aforesaid strips, and a pivot pin passing through said strips and a selected one of the apertures in said second named bar.

In testimony whereof I affix my signature.

RAY CONRAD.